United States Patent [19]

Green

[11] 3,936,366

[45] Feb. 3, 1976

[54] RADIATION POLYMERISABLE COMPOSITIONS CONTAINING 3-SORBOYLOXY-2-HYDROXYPROPYL GROUPS

[75] Inventor: George Edward Green, Cherry Hinton, England

[73] Assignee: Ciba-Geigy Corporation, Ardsley, N.Y.

[22] Filed: Feb. 28, 1974

[21] Appl. No.: 446,990

[30] Foreign Application Priority Data
Mar. 6, 1973 United Kingdom............... 10796/73

[52] U.S. Cl............ 204/159.23; 96/115 P; 96/35.1; 204/159.14; 204/159.18; 204/159.24; 260/47 UA; 260/47 EP; 260/59 EP; 260/836; 260/837 R; 260/845; 427/54; 427/96; 428/457; 428/460; 428/461; 428/901
[51] Int. Cl.².... C08F 2/46; C08F 8/18; C08F 4/00
[58] Field of Search..... 204/159.11, 159.14, 159.18, 204/159.23, 159.24; 260/836, 837 R, 845, 59

[56] References Cited
UNITED STATES PATENTS

| | | | |
|---|---|---|---|
| 3,256,226 | 6/1966 | Fekete et al. ................... | 260/837 R |
| 3,301,743 | 1/1967 | Fekete et al. ................... | 260/837 R |
| 3,709,861 | 1/1973 | Anderson...................... | 204/159.11 |
| 3,759,809 | 9/1973 | Carlick et al. ................. | 204/159.23 |
| 3,808,114 | 4/1974 | Tsuchihara et al. ........... | 204/159.19 |
| 3,825,479 | 7/1974 | Carlick et al. ................. | 204/159.23 |

FOREIGN PATENTS OR APPLICATIONS
887,702   9/1958   United Kingdom

OTHER PUBLICATIONS
Chemical Abstracts, Vol. 62, No. 7876g, 1965.

*Primary Examiner*—Richard B. Turer
*Attorney, Agent, or Firm*—Vincent J. Cavalieri

[57] ABSTRACT

Compounds having at least three 3-sorboyloxy-2-hydroxypropyl groups directly attached to ether oxygen atoms are polymerised by exposure to actinic radiation, preferably in the presence of a sensitiser such as Michler's ketone or benzoin. The compounds may be obtained by the reaction either of sorbic acid with a substance having at least three glycidyl ether groups or of glycidyl sorbate with a substance having at least three phenolic or alcoholic hydroxyl groups: if desired, not all of the glycidyl groups may be consumed, so that, after actinically-induced polymerisation, the epoxide-containing polymer may be cross-linked by reaction with a curing agent for epoxide resins.

The compounds are useful in making printed circuits or printing plates for offset printing.

28 Claims, No Drawings

RADIATION POLYMERISABLE COMPOSITIONS CONTAINING 3-SORBOYLOXY-2-HYDROXYPROPYL GROUPS

This invention relates to compositions containing substances which polymerise on exposure to actinic radiation, to methods of polymerising such substances by means of actinic radiation and of coating a surface with such compositions, to supports bearing thereon such a composition in the polymerisable state, and to supports bearing thereon a substance polymerised by means of actinic radiation.

Compositions containing compounds capable of becoming polymerised on exposure to actinic radiation are used in, for example, the preparation of printing plates for offset printing and of printed circuits, and for coating metals, such as in the manufacture of cans. There are various drawbacks in the compositions presently available which may be polymerised by exposure to actinic radiation. Some are so unstable that they must be applied to a substrate only immediately prior to exposing them to actinic radiation. Others are relatively insensitive and need lengthy exposure to actinic radiation in order to become sufficiently polymerised. Others, after being polymerised, are not resistant to etching baths used in subsequent processes. Almost all the polymerisable compounds hitherto employed have to be isolated or purified after manufacture before they are suitable for use.

We have now found that these drawbacks can be at least substantially overcome by the use of certain polysorbates having on average at least three 3-sorboyloxy-2-hydroxypropyl ($-CH_2CH(OH)CH_2-OCO-CH=CH-CH=CH-CH_3$) groups per molecule.

One aspect of the present invention thus provides a process for polymerising a polysorbate having, per average molecule, at least three 3-sorboyloxy-2-hydroxypropyl groups directly attached to ether oxygen atoms which comprises subjecting the aforesaid polysorbate to actinic radiation, optionally in the presence of a sensitiser.

Another aspect of this invention provides a composition which polymerises on exposure to actinic radiation, comprising
a. a compound having, per average molecule, at least three 3-sorboyloxy-2-hydroxypropyl groups directly attached to ether oxygen atoms, and
b. a sensitiser.

The polysorbates employed in the process of this invention are, in general, known compounds (see British Patent Specification No. 887702) but hitherto it has been known to effect their polymerisation only by means of a Diels-Alder reaction.

The aforesaid polysorbates are usually obtained by the additive reaction of a substance having, per average molecule, at least three glycidyl ether groups with an equivalent amount, based on the epoxide content of the polyglycidyl ether, of sorbic acid, or of glycidyl sorbate with an equivalent amount of a compound having, on average, at least three phenolic hydroxyl or alcoholic hydroxyl groups per molecule. These reactions may be effected in solution in the presence of a catalyst such as a tertiary amine or a quaternary ammonium salt, triethylamine or tetramethylammonium chloride being particularly suitable, and preferably in the presence of an inhibitor of free radicals, such as hydroquinone.

The polyglycidyl ethers are in turn obtainable by reaction of a compound containing at least three free alcoholic hydroxy or phenolic hydroxy groups per molecule with epichlorohydrin or glycerol dichlorohydrin under alkaline conditions or, alternatively, in the presence of an acidic catalyst and subsequent treatment with alkali. These glycidyl ethers may be derived from acyclic alcohols, from alcohols having aromatic nuclei, from phenols such as novolaks, and from phenolic alcohols.

If desired, the polyglycidyl ether may first be treated with a dicarboxylic acid, such as sebacic acid and maleic acid, or with a dihydric phenol, such as resorcinol, 2,2-bis(p-hydroxyphenyl)propane, 2,4-dihydroxyacetophenone, 2,2-bis(3,5-dibromo-4-hydroxyphenyl)propane, 2,2'-dihydroxybenzophenone, 2,2'-dihydroxy-4-methoxybenzophenone, bis(p-hydroxyphenyl) sulphone, and 1,1-bis(p-hydroxyphenyl)-2,2,2-trichloroethane, in order to advance the polyepoxide, that is to say, to link two or more molecules and so increase the number of epoxide groups per average molecule. Of course, it is important to avoid using too large a quantity of the dicarboxylic acid or dihydric phenol, otherwise the polyepoxide would become cured, i.e., cross-linked, insoluble, and infusible. If, on the other hand, it is so desired, the polysorbate employed in the process of the invention may be used admixed with a compound containing, per average molecule, only two 3-sorboyloxy-2-hydroxypropyl groups directly attached to ether oxygen atoms. These disorbates are obtainable analogously to the aforesaid polysorbates from sorbic acid and an equivalent amount, calculated on its epoxide group content, of a diglycidyl ether, or from glycidyl sorbate and an equivalent amount of a dihydric alcohol or phenol.

The preferred polyglycidyl ethers are those of phenols, especially of a phenol-formaldehyde or cresol-formaldehyde novolak or of 1,1,2,2-tetra(p-hydroxyphenyl)ethane, and of phenolic alcohols (bearing glycidyl ether groups on phenolic and alcoholic hydroxyl groups) such as those of the formula

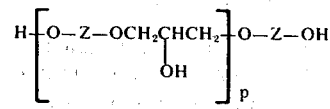

where
Z is the residue of a dihydric phenol after removal of two phenolic -OH groups, and preferably denotes

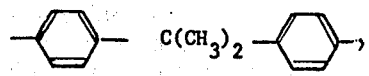

and
p is an integer of average value at least 1 and at most 50.

Of the compounds, having on average at least three hydroxy groups, which may be treated with glycidyl sorbate to give the polymerisable polysorbate, phenolic novolaks (especially phenol-formaldehyde and cresol-formaldehyde novolaks) and 1,1,2,2-tetra(p-hydroxyphenyl)ethane are preferred.

It is within the scope of the invention to employ in the process a polysorbate containing 1,2-epoxide groups, especially an adduct of a polyglycidyl ether with sufficient sorbic acid so that the adduct has at least three 3-sorboyloxy-2-hydroxypropyl groups but a proportion of the epoxide groups remains unconsumed. The irradiated polysorbate may then be cross-linked through reaction with a polycarboxylic acid anhydride or other heat-curing agent for epoxide resins, especially dicyandiamide. (Epoxide resins are substances containing on average more than one 1,2-epoxide group per molecule.). Such additional cross-linking often enhances the adhesion of the polymerised composition to the support.

In polymerising the polysorbate and polymerisable compositions containing it, according to this invention, actinic radiation of wavelength 200 to 600 nm is preferably used.

Polymerisation of the polysorbate is accelerated by employing a sensitiser. Most substances known as sensitisers in conventional processes involving actinically-induced polymerisation are suitable. Those which are preferred are bis(dialkylamino)benzophenones, especially bis(p-dimethylamino)benzophenone, i.e., Michler's ketone, and bis(p-diethylamino)benzophenone, and benzoyl phenyl carbinols, especially benzoin and their alkyl ethers. Usually from 0.1 to 20%, and preferably from 0.5 to 15%, by weight of the sensitiser calculated on the weight of the polysorbate, is employed.

As prepared, the polysorbates may contain small quantities of a hydroquinone or other free-radical inhibitor added to prevent free radical polymerisation taking place during preparation of the polysorbate. Such inhibitors are usually not deleterious since they maintain the stability of the composition during storage but do not prevent polymerisation on exposure to actinic radiation.

The polysorbates used in the process of this invention are of particular value in the production of printing plates and printed circuits. A layer of the polysorbate may be applied to a support by coating the support with a solution of the polysorbate in any convenient solvent, e.g., a mixture of toluene and acetone or of toluene and ethyl methyl ketone, or cyclohexanone, and allowing or causing the solvent to evaporate: the layer may be applied by dipping, spinning, spraying, or by means of a roller.

This invention therefore also includes a method of coating a surface with a polysorbate and a sensitiser, which comprises applying to that surface a solution of a polysorbate, and a sensitiser, and allowing or causing the solvent to evaporate. It further includes a plate sensitive to actinic radiation, comprising a support, which may be of, for example, paper, copper, aluminum or other metal, synthetic resin, or glass, carrying a layer of a polysorbate, and a sensitiser, also a support bearing upon its surface a polysorbate which has been polymerised by exposure to actinic radiation. It also provides a method of polymerising a polysorbate, optionally in the presence of a sensitiser, which comprises subjecting a plate carrying a layer of the polysorbate to actinic radiation, optionally imagewise as through a negative, and removing the unpolymerised portions, if any, of the polysorbate by means of a solvent.

The coating of the polysorbate should be applied to the support so that, upon drying, its thickness will be in the range of from about 1 to 250 $\mu$m. The thickness of the polymerisable layer is a direct function of the thickness desired in the relief image, which will depend on the subject being reproduced and particularly on the extent of the non-printing areas. The wet polymer coating may be dried by air drying or by any other known drying technique, and the polymerisable system may then be stored until required for use.

The polymerisable coatings can be insolubilised by exposure to actinic radiation through an image-bearing transparency consisting of substantially opaque and transparent areas. Suitable sources of actinic radiation include carbon arcs, mercury vapour arcs, fluorescent lamps with phosphors emitting ultra-violet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of a polysorbate will depend upon a variety of factors which include, for example, the individual polysorbate being utilised, the thickness of the coating, the nature of the sensitiser, and the type of light source and its distance from the coating.

Subsequent to their exposure, the coatings are "developed" by being washed with a suitable liquid, such as perchloroethylene, methylene chloride, ethylene dichloride, acetone, ethyl methyl ketone, cyclohexanone, n-propanol, ethanol, toluene, benzene, ethyl acetate, and mixtures thereof, to dissolve and remove that portion of the coating which was not polymerised by exposure to actinic radiation. Liquids used for this operation must be selected with care since they should have good solvent action on the unexposed areas yet have little effect upon either the polymerised polysorbate or the substrate. The developing solvent should normally be allowed to remain in contact with the coating for from about 30 seconds to 3 minutes, depending upon which solvent is utilized. The developed polymer coating should next be rinsed with fresh solvent and dried.

If appropriate, for example, in the production of printed circuits where the support is of copper or of other suitable electrical-conducting metal, the exposed metal is etched in a conventional manner using ferric chloride or ammonium persulphate solutions.

The polysorbate may, if desired, be partially polymerised before applying it to the support, in order to improve the film-forming or mechanical properties of the irradiated product. Such a partial prepolymerisation can be effected by heating: it should not, however, proceed beyond the stage at which a correctly differentiated image is obtained on the plate when the plate is exposed. The composition may also be heated after exposure to actinic radiation to enhance the degree of polymerisation.

The invention is illustrated by the following Examples, in which all parts are by weight, unless otherwise indicated.

EXAMPLE 1

A mixture of 85 g of an epoxy novolak resin (having an epoxide content of 5.48 equiv./kg and being a polyglycidyl ether made from a phenol-formaldehyde novolak of number average molecular weight 420, hereinafter called "Epoxy novolak I"), sorbic acid (56 g), triethylamine (1.4 g), hydroquinone (0.14 g), and toluene (400 g) was heated under reflux for 5 hours, by which time the epoxide content of the mixture had fallen to a negligibly low value. Toluene (562 g) and acetone (321 g) were added to give a clear (10%) solution of the polysorbate. To this solution was added Michler's ketone as sensitiser (6.75 g, i.e., 5% of the weight of the polysorbate) and the composition was used to prepare a printed circuit in the following manner.

A copper-clad laminate was coated with the composition and the solvent was allowed to evaporate, leaving a film about 10 μm thick. This film was irradiated for 30 seconds through a negative using a 125 watt medium pressure mercury lamp at a distance of 230 mm. After irradiation the image was developed in a mixture of acetone and toluene (1:3), washing away the unexposed areas to leave a good relief image on the copper. The uncoated copper areas were then etched using an aqueous solution of ferric chloride (60% w/v $FeCl_3$) containing concentrated hydrochloric acid (10% v/v).

EXAMPLE 2

The polymerisable composition of Example 1, to which had been added benzoin methyl ether (5% by weight of the polysorbate) as sensitiser in place of Michler's ketone, was used to produce a protective coating as follows.

The solution was applied to an aluminum surface and the solvent was allowed to evaporate, leaving a film between 10 and 20 μm thick. This film was irradiated for 30 minutes as described in Example 1 to give a good coating of a polymer which was resistant to solvents — 20 rubs with a cotton wool swab soaked in acetone did not remove the coating.

EXAMPLE 3

A mixture of 50 g of the tetraglycidyl ether of 1,1,2,2-tetra(p-hydroxyphenyl)ethane (having an epoxide content of 5.2 equiv./kg), sorbic acid (28.8 g), triethylamine (0.8 g), hydroquinone (0.1 g), and toluene (200 g) was heated under reflux for 5 hours, by which time the epoxide content was negligible.

A solution (10%) was made up as in Example 1 and tested. A good image was obtained after 3 minutes' irradiation and was developed with ethanol.

EXAMPLE 4

In this Example the epoxy novolak is advanced with resorcinol. Epoxy novolak I (50 g), sorbic acid (23 g), resorcinol (3.8 g), triethylamine (0.8 g), hydroquinone (0.08 g), and toluene (150 g) were heated together under reflux for 5 hours, by which time the mixture was epoxide-free.

A polymerisable composition was prepared by adding acetone (60 g), 2-methoxyethanol (20 g), toluene (220 g), and Michler's ketone (3.75 g, 5% by weight of the polysorbate). This solution was tested as in Example 1. A good image was obtained after 3 minutes' irradiation and was developed with acetone-toluene (1:3).

EXAMPLE 5

In this Example the epoxy novolak is advanced with 2,2-bis(p-hydroxyphenyl)propane.

Epoxy novolak I (50 g), sorbic aid (15.3 g), 2,2-bis(p-hydroxyphenyl)propane (3.8 g), triethylamine 0.7 g), hydroquinone (0.7 g), and ethyl methyl ketone (150 g) were heated together under reflux for 30 hours, by which time the epoxide content was negligible.

The solution was diluted with ethyl methyl ketone (480 g), Michler's ketone (3.5 g, 10% by weight of the polysorbate) was added, and this compositon was tested as in Example 1. A good image was obtained after 90 seconds' irradiation and was developed with acetone-toluene (1:3).

EXAMPLE 6

A diglycidyl ether of 2,2-bis (p-hydroxyphenyl)propane having an epoxide content of 5.3 equiv./kg (10 g), the tetraglycidyl ether employed in Example 3 (40 g), sorbic acid (28 g), triethylamine (0.8 g), hydroquinone (0.1 g), and toluene (200 g) were heated together under reflux for 5 hours, by which time the epoxide content was negligible.

A 10% solution of the product in acetone-toluene (1:3) containing Michler's ketone (5% by weight of the polysorbate) was tested as described in Example 1. A good image was obtained after 5 minutes' irradiation and was developed with ethanol.

EXAMPLE 7

A phenol-formaldehydr novolak resin, having a number average molecular weight of 420 (12.6 g), gylcidyl sorbate having an epoxide content of 5.95 equiv./kg (20 g), triethylamine (0.3 g), hydroquinone (0.03 g), and toluene (50 g) were heated together under reflux for 5 hours, by which time the epoxide content was nil.

A solution of the polysorbate was made up as described in Example 1 and tested. A good image was obtained after 3 minutes' irradiation and and was developed as Example 1.

EXAMPLE 8

In this Example an epoxy novolak is advanced with sebacic acic. A mixture of Epoxy novolak I (50 g), sorbic acid (22.4 g), sebacic acid (7.5 g), triethylamine (0.8 g), hydroquinone (0.1 g), and toluene (200 g) was heated under reflux for 5 hours, by which time it was epoxide-free. Toluene (334 g), acetone (178 g), and Michler's ketone (4 g) were then added. The solution was tested as in Example 1. A good image was obtained after 3 minutes' irradiation and was developed with acetone-toluene (1:3).

EXAMPLE 9

A mixture of an epoxy novolak having an epoxide content of 5.3 equiv./kg and being a polyglycidyl ether of a novolak of number average molecular weight 950 (50 g), sorbic acid (29.5 g), triethylamine (0.8 g), hydroquinone (0.1 g), and toluene (200 g) was heated under reflux for 5 hours, by which time the epoxide content was negligible.

A solution was made up as in Example 1 and tested. A good image was obtained after 30 seconds' irradiation and was developed with acetone-toluene (1:3).

EXAMPLE 10

Epoxy novolak I (50 g), sorbic acid (24.5 g), tetramethylammonium chloride (0.4 g), hydroquinone (0.1 g), and toluene (200 g) were heated under reflux for 5 hours. The solvent was removed under reduced pressure to give the product which had an epoxide content of 0.76 equiv./kg.

A polymerisable composition was prepared by dissolving 10 g of the product, 0.1 g of dicyandiamide, and 0.5 g of Michler's ketone in 30 g of cyclohexanone. A copper-clad laminate was coated with this composition and the solvent was allowed to evaporate, leaving a film about 20 μm thick. This film was irradiated for 3 minutes through a negative using a 500 watt medium pressure mercury lamp at a distance of 450 mm. The plate was developed in ethanol, leaving a good relief image on the copper. The plate was then heated at 180°C for 15 minutes: the coating of the polymer in the image areas had very good adhesion to the copper and excellent solvent resistance — 20 rubs with a cotton wool swab soaked in acetone did not remove the coating. The coated copper areas were completely resistant to the etching solution described in Example 1.

EXAMPLE 11

The process of Example 1 was repeated, omitting, however, the Michler's ketone. A satisfactory image was obtained on irradiation for 30 minutes.

EXAMPLE 12

In this Example a tetraglycidyl ether is advanced with 2,2-bis(p-hydroxyphenyl)propane.

A mixture of 50 g of the tetraglycidyl ether used in Example 3, sorbic acid (21.6 g), 2,2-bis(p-hydroxyphenyl)propane (7.35 g), triethylamine (0.8 g), hydroquinone (0.1 g), and toluene (200 g) was heated under reflux for 5 hours, by which time the epoxide content was negligible.

A solution (10%) was made up as in Example 1, Michler's ketone (5% on the weight of polysorbate) was added, and the solution was tested. A good image was obtained after 3 minutes' irradiation and was developed with acetone-toluene (1:3).

EXAMPLE 13

In this Example the epoxy novolak is advanced with maleic acid. Epoxy novolak I (50 g), sorbic acid (22.4 g), maleic acid (8.6 g), triethylamine (0.8 g), hydroquinone (0.1 g), and toluene (200 g) were heated together under reflux for 5 hours, by which time the mixture was epoxide-free.

A solution (10%) was made up as in Example 1, 5% of Michler's ketone, calculated on the weight of polysorbate, was added, and the solution was tested. In this Example the film was irradiated using a 550 watt medium pressure mercury lamp at a distance of 450 mm. A good image was obtained after 3 minutes' irradiation and was developed in acetone-toluene (1:3).

EXAMPLE 14

In this Example the epoxy novolak is advanced with 2,2-bis(p-hydroxyphenyl)propane in the presence of tetramethylammonium chloride as catalyst.

Epoxy novolak I (50 g), sorbic acid (16.7 g), 2,2-bis(p-hydroxyphenyl)propane (11.45 g), tetramethylammonium chloride (0.3 g) and cyclohexanone (80 g) were stirred together at 120°C for 7 hours, by which time the epoxide content was negligible.

A polymerisable composition was prepared by adding cyclohexanone (230 g) and Michler's ketone (0.8 g, approximately 1% by weight of polysorbate). This solution was tested as in Example 13. A good image was obtained after 20 seconds' irradiation and was developed with cyclohexanone.

EXAMPLE 15

In another experiment a coating of the solution of the polysorbate (without additional cyclohexanone and the Michler's ketone) was dried at 90°C for 10 minutes and irradiated for 6 minutes at a distance of 250 mm with a 5,000 watt metal halide lamp. A good image was obtained and was developed with cyclohexanone.

EXAMPLE 16

In this Example the epoxy novolak is advanced with 2,2-bis(p-hydroxyphenyl)propane in n-butanol-xylene.

Epoxy novolak I (50 g), sorbic acid (16.8 g), 2,2-bis(p-hydroxyphenyl) propane (10.5 g), tetramethylammonium chloride (0.3 g), n-butanol (16 g), and xylene (64 g) were stirred together at 120°C for 6 hours, by which time the epoxide content was negligible. 2-Ethoxyethyl acetate (80 g) was added to give a clear solution of the polysorbate.

To this solution was added Michler's ketone as sensitiser (1% by weight of the polysorbate) and the mixture was tested as in Example 13. A good image was obtained after 30 seconds' irradiation and was developed with n-butanol-xylene (1:4).

EXAMPLE 17

In this Example an epoxy novolak made from a cresol-formaldehyde resin is advanced.

A mixture of 50 g of an epoxy cresol novolak (having an epoxide content of 4.25 equiv./kg and being a polyglycidyl ether made from a cresol-formaldehyde novolak of number average molecular weight 1270), sorbic acid (16.5 g), 2,2-bis(p-hydroxyphenyl)propane (16.5 g), tetramethylammonium chloride (0.2 g), hydroquinone (0.07 g), and cyclohexanone (71 g) was stirred at 120°C for 6 hours, by which time the epoxide content was negligible.

The solution was diluted with cyclohexanone (213 g), Michler's ketone (1% by weight of the polysorbate) was added, and this composition was tested as in Example 13. A good image was obtained after 30 seconds' irradiation and was developed with cyclohexanone.

EXAMPLE 18

In this Example the polysorbate used is made from a substance containing glycidyl groups attached to both aryl and alkyl ether oxygen atoms.

The epoxide resin of formula

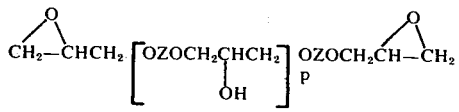

where Z denotes

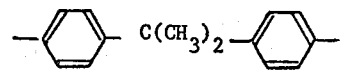

and p is an integer of average value in the range 2.0 to 2.5, containing 1.9 to 2.2 epoxide-equiv./kg, was glycidylated at its β-hydroxy groups to afford a polyglycidyl material containing 4.25 epoxide-equiv./kg. (Glycidylation of such β-hydroxy groups is described in Technical Report No. 3323 of the Plastics and Packaging Laboratory, Feltman Research Laboratories, Picatinny Arsenal, Dover, N.J. USA, Clearing House Report No. AD 686100.)

This glycidylated material (50 g), sorbic acid (23.7 g), triethylamine (0.8 g), hydroquinone (0.08 g), and toluene (200 g) was heated under reflux for 5 hours, by which time the epoxide content of the mixture had fallen to a negligible value. Toluene (4.71 g) was added to give a solution (10%) of the polysorbate.

The solution containing Michler's ketone (5% by weight of the polysorbate) was tested according to Example 13. A good image was obtained after 2 minutes' irradiation and was developed with toluene.

EXAMPLE 19

In this Example the glycidylated epoxide resin made as described in Example 18 is advanced with 2,2-bis(p-hydroxyphenyl)propane.

A mixture of 40 g of the polyglycidyl ether, sorbic acid (14.2 g), 2,2-bis(p-hydroxyphenyl)propane (4.8 g), triethylamine (0.7 g), hydroquinone (0.08 g), and toluene (200 g) was heated under reflux for 5 hours. The solvent was removed under reduced pressure to leave a polysorbate which was epoxide-free.

A 20% solution of this product in cyclohexanone containing Michler's ketone (5% by weight of the polysorbate) was tested according to Example 13. A good image was obtained after 4 minutes' irradiation and was developed with cyclohexanone.

EXAMPLE 20

In this Example, a glycidylated epoxide resin similar to that employed in Example 18 but of higher molecular weight is used.

An epoxide resin of formula II, where $p$ is an integer of average value in the range 15.5 to 27, was glycidylated to give a product containing 3.28 epoxide equiv./kg. This product (100 g), sorbic acid (30 g), tetramethylammonium chloride (0.4 g), hydroquinone (0.1 g), and cyclohexane (235 g) was stirred at 120°C for 5 hours.

The solution was diluted with cyclohexanone (300 g), Michler's ketone (1% by weight of the polysorbate) was added, and this composition was tested as in Example 13. A good image was obtained after 20 seconds' irradiation and was developed with cyclohexanone.

EXAMPLE 21

A mixture of 50 g of glycerol triglycidyl ether (having an epoxide content of 6.0 equiv./kg), sorbic acid (33.6 g), hydroquinone (0.1 g), tetramethylammonium chloride (0.2 g) and cyclohexanone (85 g) was stirred at 120°C for 3 hours, by which time the epoxide content of the mixture was negligible.

To the mixture was added Michler's ketone (1% by weight of the polysorbate) and the solution was tested as in Example 13. A good image was obtained after 10 minutes' irradiation and was developed in toluene. The film was slightly tacky but lost its tackiness on being left in air for a few hours.

EXAMPLE 22

Epoxy novolak I (100 g), an advanced resin (prepared by heating together 46 g of 2,2-bis(p-hydroxyphenyl)propane with 38 g of 2,2-bis(p-hydroxyphenyl)propane diglycidyl ether having an epoxide content of 5.3 equiv./kg in the presence of 0.2 g of tetramethylammonium chloride at 180°C for 1½ hours), sorbic acid (33.4 g), tetramethylammonium chloride (0.5 g), hydroquinone (0.16 g), and cyclohexanone (218 g) were heated together at 120°C for 5 hours.

The solution was diluted with cyclohexanone (655 g), Michler's ketone (1% by weight of the polysorbate) was added, and this composition was tested as in Example 13. A good image was obtained after 30 seconds' irradiation and was developed with cyclohexanone.

EXAMPLE 23

A mixture of Epoxy novolak I (50 g), 2,4-dihydroxyacetophenone (7.6 g), sorbic acid (16.7 g), tetramethylammonium chloride (0.25 g), hydroquinone (0.08 ), and cyclohexanone (78 g) was stirred at 120°C for 5 hours, by which time the epoxide content was negligible.

The mixture was diluted with cyclohexanone (160 g) and Michler's ketone (0.8 g) was added. This solution was tested as in Example 13. A good image was obtained after 5 minutes' irradiation and was developed with cyclohexanone.

EXAMPLE 24

A mixture of Epoxy novolak I (50 g), sorbic acid (16.7 g), 2,2-bis(3,5-dibromo-4-hydroxyphenyl)propane (27.3 g), hydroquinone (0.2 g), tetramethylammonium chloride (0.25 g), and cyclohexanone (68 g) was stirred at 120°C for 3½ hours, by which time the epoxide content of the mixture was 0.3 equiv./kg.

To the mixture was added cyclohexanone (200 g) and Michler's ketone (0.9 g). This solution was tested as in Example 13. A good image was obtained after 3½ minutes' irradiation and was developed with cyclohexanone.

EXAMPLE 25

A mixture of Epoxy novolak I (25 g), sorbic acid (8.35 g), 2,2-bis(p-hydroxyphenyl)propane (3.7 g), 2,2'-dihydroxy-4-methoxybenzophenone (2.15 g), hydroquinone (0.05 g), tetramethylammonium chloride (0.1 g), and cyclohexanone (39 g) was stirred at 120°C for 5 hours, by which time the epoxide content of the mixture was negligible. To this mixture was added 80 g cyclohexanone and the solution was tested as in Example 13. A good image was obtained after 20 minutes' irradiation and was developed with cyclohexanone.

EXAMPLE 26

The procedure of Example 25 was repeated except that Michler's ketone (1% by weight of the polysorbate) was added as photosensitiser. A similar image was obtained after only 5 minutes' irradiation.

EXAMPLE 27

A mixture of Epoxy novolak I (25 g) sorbic acid (8.35 g), 2,2-bis(p-hydroxyphenyl)propane (3.7 g), 2,4-dihydroxybenzophenone (1.9 g), hydroquinone (0.05 g), tetramethylammonium (0.1 g), and cyclohexanone (39 g) was stirred at 120°C for 5 hours, by which time the epoxide content of the mixture was negligible. The results obtained on irradiation in the presence of Michler's ketone were the same as those in Example 25.

EXAMPLE 28

A mixture of Epoxy novolak I (50 g), sorbic acid (16.7 g), bis(p-hydroxyphenyl) sulphone (12.55 g), hydroquinone (0.1 g), tetramethylammonium chloride (0.25 g), and cyclohexanone (79 g), was stirred at 120°C for 5 hours, by which time the epoxide content of the mixture had fallen to 0.43 equiv./kg. To this mixture was added cyclohexanone (160 g) and Michler's ketone (0.8 g). The solution was tested as in Example 13. A good image was obtained after 5 minutes' irradiation and was developed with cyclohexanone.

In place of the ferric chloride solution used for etching in this Example could be employed a 30% aqueous solution of ammonium persulphate at 40°C.

EXAMPLE 29

A mixture of Epoxy novolak I (50 g), sorbic acid (16.7 g), 1,1-bis(p-hydroxyphenyl)-2,2,2-trichloroethane (15.9 g), hydroquinone (0.1 g), tetramethylammonium chloride (0.25 g), and cyclohexanone (83 g) was stirred at 120°C for 3½ hours, by which time the epoxide content of the mixture had fallen to 0.39 equiv./kg. To this mixture was added cyclohexanone (160 g) and Michler's ketone (0.8 g). The solution was tested as in Example 13. A good image was obtained after 3 minutes' irradiation and was developed with cyclohexanone.

We claim:

1. A process for polymerising a polysorbate having, per average molecule, at least three 3-sorboyloxy-2-hydroxypropyl groups directly attached to ether oxygen atoms, which polysorbate has been obtained by the additive reaction of a compound containing at least three glycidyl groups with sorbic acid or of glycidyl sorbate with a substance having at least three phenolic or aliphatic hydroxyl groups, which comprises subjecting the polysorbate to actinic radiation.

2. A process according to claim 1, in which the compound containing at least three glycidyl ether groups is a polyglycidyl ether of a phenol containing at least three phenolic hydroxyl groups.

3. A process according to claim 2, in which the phenol is a phenol-formaldehyde novolak, a cresol-formaldehyde novolak, or 1,1,2,2-tetrakis(p-hydroxyphenyl)ethane.

4. A process according to claim 1, in which the compound containing at least three glycidyl ether groups is a phenolic alcohol bearing glycidyl ether groups or phenolic hydroxyl and alcoholic hydroxyl groups.

5. A process according to claim 4, in which the phenolic alcohol is of the formula $$H\left[O-Z-OCH_2\underset{OH}{CHCH_2}\right]_p O-Z-OH$$

where
Z is the residue of a dihydric phenol after removal of two phenolic —OH groups, and
p is an integer of average value from 1 to 50.

6. A process according to claim 5, in which Z denotes

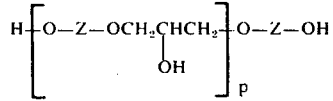

7. A process according to claim 1, in which the polysorbate is an adduct of such a polyglycidyl ether which has been advanced by reaction with a dicarboxylic acid or with a dihydric phenol.

8. A process according to claim 7, in which the dicarboxylic acid is sebacic acid or maleic acid.

9. A process according to claim 7, in which the dihydric phenol is resorcinol, 2,2-bis(p-hydroxyphenyl)propane, 2,4-dihydroxyacetophenone, 2,2-bis(3,5-dibromo-4-hydroxyphenyl)propane, 2,2'-dihydroxybenzophenone, 2,2'-dihydroxy-4-methoxybenzophenone, bis(p-hydroxyphenyl) sulphone, or 1,1-bis(p-hydroxyphenyl)-2,2,2-trichloroethane.

10. A process according to claim 1, in which the polysorbate contains free 1,2-epoxide groups.

11. A process according to claim 10, in which the polysorbate is, after polymerisation through irradiation, cross-linked through reaction of its 1,2-epoxide groups with a heat-curing agent for epoxide resins.

12. A process according to claim 1, in which the polysorbate is subjected to actinic radiation on a support and then any unpolymerised polysorbate is removed by means of a solvent.

13. A process according to claim 1, in which the polysorbate is subjected to actinic radiation imagewise.

14. A process according to claim 1, in which the polysorbate is subjected to actinic radiation in the presence of a photo-sensitiser.

15. A process according to claim 14, in which the sensitiser is a bis(dialkylamino)benzophenone, a benzoyl phenyl carbinol, or an alkyl ether of a benzoyl phenyl carbinol.

16. A process according to claim 14, in which there is used from 0.1 to 20% by weight of the sensitiser, calculated on the weight of the polysorbate.

17. A composition which polymerises on exposure to actinic radiation, comprising
a. a polysorbate having, per average molecule, at least three 3-sorboyloxy-2-hydroxypropyl groups directlyy attached to ether oxygen atoms, which polysorbate has been obtained by the additive reaction of a compound containing at least three glycidyl groups with sorbic acid or of glycidyl sorbate with a substance having at least three phenolic or aliphatic hydroxyl groups, and
b. a photo-sensitiser.

18. A composition according to claim 17, in which the compound containing at least three glycidyl ether groups is a polyglycidyl ether of a phenol containing at least three phenolic hydroxyl groups.

19. A composition according to claim 18, in which the phenol containing at least three phenolic hydroxyl groups is a phenol-formaldehyde novolak, a cresol-formaldehyde novolak, or 1,1,2,2,-tetrakis(p-hydroxyphenyl)ethane.

20. A composition according to claim 17, in which the compound containing at least three glycidyl ether groups is a polyglycidyl ether of a phenolic alcohol bearing glycidyl ether groups on phenolic hydroxyl and alcoholic hydroxyl groups.

21. A composition according to claim 20, in which the phenolic alcohol is of the formula $$H\left[O-Z-OCH_2\underset{OH}{CHCH_2}\right]_p O-Z-OH$$

where
Z is the residue of a dihydric phenol after removal of two phenolic —OH groups, and
p is an integer of average value from 1 to 50.

22. A composition according to claim 21, in which Z denotes

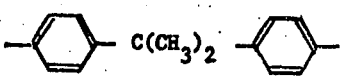

23. A composition according to claim 17, in which the polysorbate is an adduct of such a polyglycidyl ether which has been advanced by reaction with a dicarboxylic acid or with a dihydric phenol.

24. A composition according to claim 23, in which the dicarboxylic acid is sebacic acid or maleic acid.

25. A composition according to claim 23, in which the dihydric phenol is resorcinol, 2,2-bis(p-hydroxyphenyl)propane, 2,4-dihydroxyacetophenone, 2,2-bis(3,5-dibromo-4-hydroxyphenyl)propane, 2,2′dihydroxybenzophenone, 2,2′-dihydroxy-4-methoxybenzophenone, bis(p-hydroxyphenyl) sulphone, or 1,1-bis(p-hydroxyphenyl)-2,2,2-trichloroethane.

26. A composition according to claim 17, in which the polysorbate contains free 1,2-epoxide groups.

27. A composition according to claim 17, in which the sensitiser is a bis(dialkylamino)benzophenone, a benzoyl phenyl carbinol, or an alkyl ether of a benzoyl phenyl carbinol.

28. A composition according to claim 17, containing 0.1 to 20% by weight of the sensitiser, calculated on the weight of the polysorbate.

* * * * *